May 30, 1967  G. W. ROACH  3,322,256
BALE CONVEYOR WITH BALE ORIENTATING MEANS
Filed Oct. 5, 1965  4 Sheets-Sheet 2
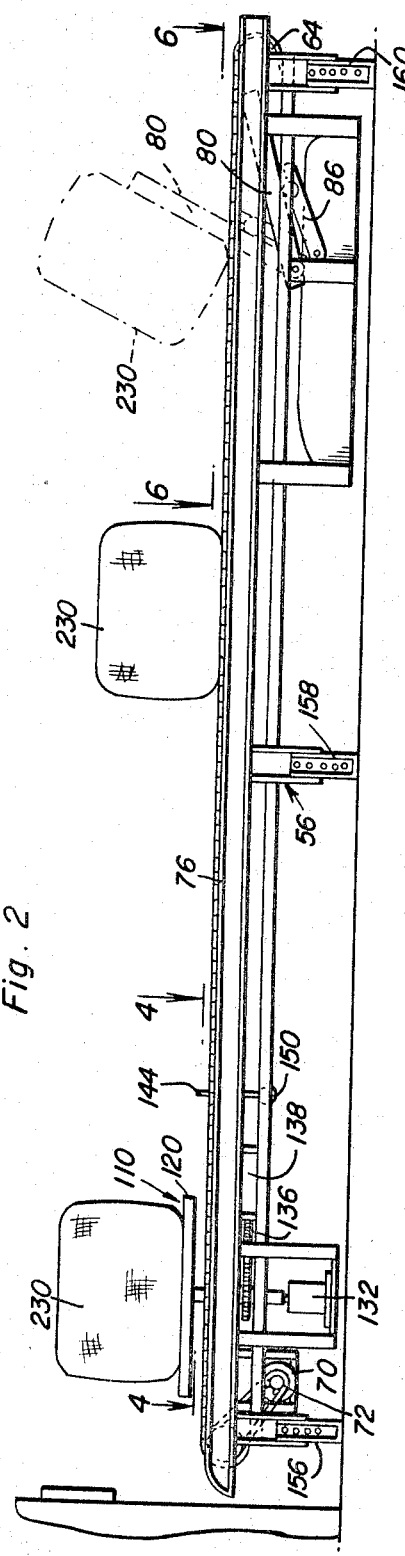
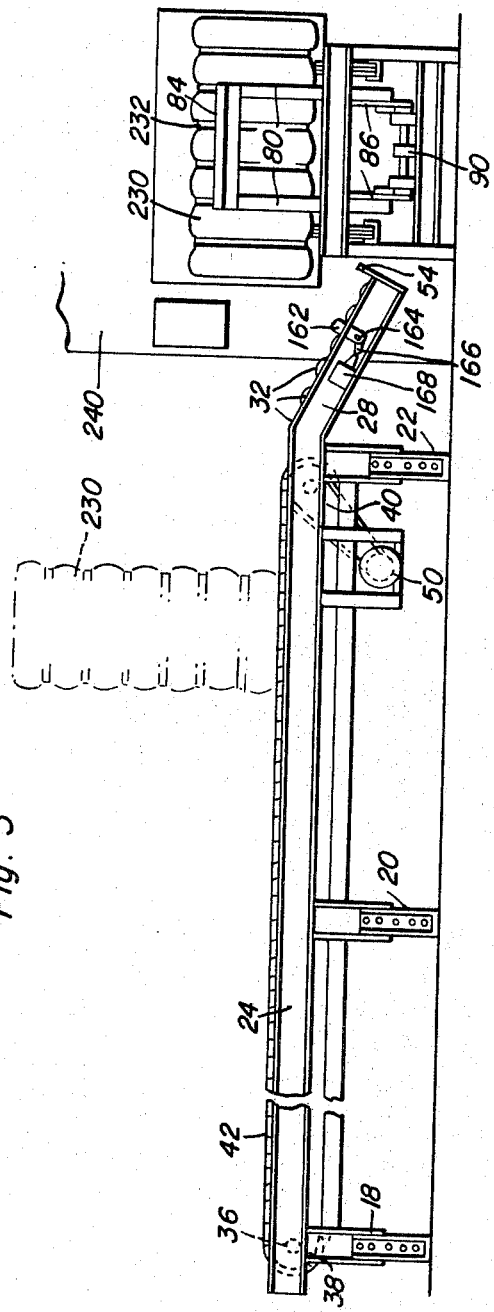
Gay W. Roach
INVENTOR.

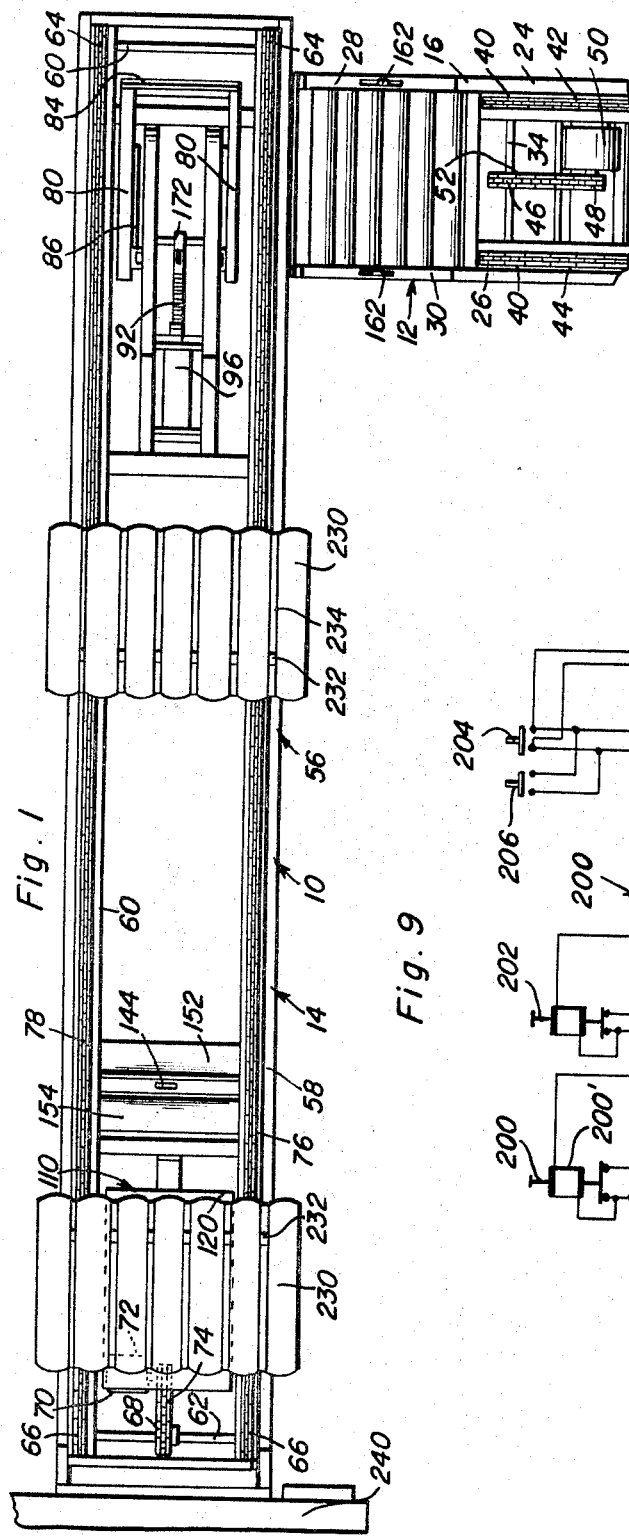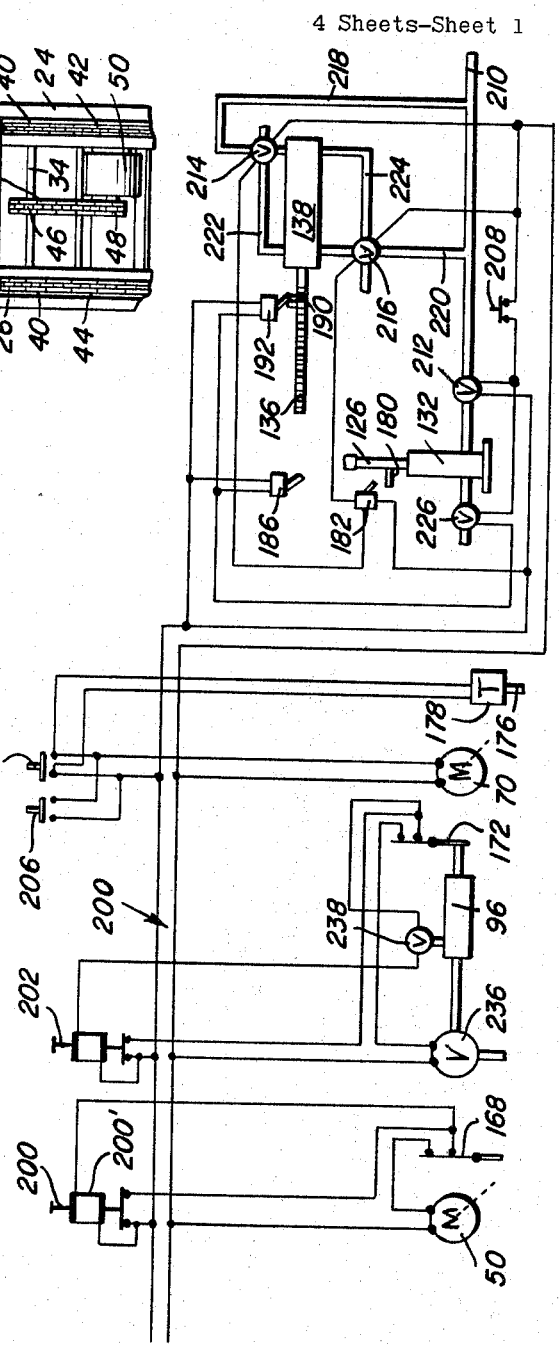

May 30, 1967  G. W. ROACH  3,322,256
BALE CONVEYOR WITH BALE ORIENTATING MEANS
Filed Oct. 5, 1965  4 Sheets-Sheet 3

Gay W. Roach
INVENTOR.

BY Clarence A. O'Brien
and Harvey B. Jacobson
Attorneys

May 30, 1967 G. W. ROACH 3,322,256
BALE CONVEYOR WITH BALE ORIENTATING MEANS
Filed Oct. 5, 1965 4 Sheets-Sheet 4

Gay W. Roach
INVENTOR.

BY Clarence A. O'Brien
and Harvey B. Jacobson
Attorneys

United States Patent Office 3,322,256
Patented May 30, 1967

3,322,256
BALE CONVEYOR WITH BALE ORIENTATING
MEANS
Gay W. Roach, 521 Locus St., Trumann, Ark. 72472
Filed Oct. 5, 1965, Ser. No. 493,146
10 Claims. (Cl. 198—33)

This invention relates to a novel and useful bale conveyor provided with bale orientating means.

In the cotton industry the cotton is picked and subsequently baled into large bales bound by a plurality of metal bands. These banded bales are then shipped to a point where the cotton is processed for subsequent use. The bales are unloaded from their conveyance and thereafter the bales are placed into a press in which the bales are opened. The machines utilized to initially bale the cotton operate to form a bale and then band the bale with a plurality of metal bands each buckled at approximately the same location on one side of the bale and it has been found that the bales to be opened are most conveniently handled by workmen when the bale to be opened is placed within the bale opening press in a manner such that the buckles on the bands of each bale face the discharge opening of the press and are disposed adjacent the uppermost portion of the bale as it rests within the press. Therefore, it is desirable that each bale be advanced into the bale opening press with the bale properly orientated relative to the press.

The bale conveyor of the instant invention is primarily designed to receive cotton bales and to convey the bales positioned thereon to the inlet opening of a bale opening press. In addition, the bale conveyor of the instant invention includes means whereby a bale positioned on the conveyor in a position which is not properly orientated relative to the bale opener may be flipped about a horizontal axis extending transversely of the conveyor and/or rotated about a vertical axis in order to properly orientate the buckles on the bale to be opened relative to the bale opening press.

The bale conveyor of the instant invention includes a bale receiving portion thereon adapted to receive bales from either a two bale or three bale fork lift truck and the conveyor may be readily approached by the fork lift truck positioning cotton bales thereon from either side. By this construction, the operator of the fork lift truck may take initial steps to properly orientate the bales on the conveyor of the instant invention so as to reduce the number of those bales handled by the conveyor which have to be flipped and/or rotated in order to properly position the buckles on the bands encircling the bales relative to the bale opening press which is fed by the conveyor.

The bales are initially handled in an upright position by the fork lift truck and are therefore placed upon the inlet end of the bale conveyor of the instant invention in an upright position. The inlet end portion of the bale conveyor includes means by which each bale of cotton handled thereby may be tilted and placed on one side thereof as each bale passes from the inlet end portion of the bale conveyor of the instant invention to the outlet portion thereof. The outlet portion or discharge portion of the bale conveyor includes means whereby a bale may be successfully flipped and rotated in the aforementioned manner if such reorientation of the bale is needed in order for it to be properly orientated in the bale opening press. In addition, each bale handled by the discharge end portion of the conveyor may be only flipped or only rotated as the need arises or, if initially properly orientated on the discharge portion of the conveyor, the bale may be conveyed directly to the bale opening press without being flipped and/or rotated.

The basic operating features of the instant invention are described in detail hereinafter and one form of control means for actuating the various portions of the bale conveyor, for actuating the bale flipping mechanism and for actuating the bale rotating mechanisms is also hereinafter described with reference to the accompanying drawings. However, it is to be noted that any suitable form of control means for actuating the various operating features of the bale conveyor of the instant invention may be utilized.

The main object of this invention is to provide a bale conveyor capable of receiving a plurality of bales in upstanding position and subsequently conveying the bales disposed thereon to a bale opening press.

Another object of this invention, in accordance with the immediately preceding object, is to provide a bale conveyor operable to tilt the upright bales handled thereby into horizontal positions and to thereafter selectively and alternately rotate the bales 90 degrees about a horizontal axis and 180 degrees about a vertical axis for proper orientation of the bale relative to the bale opening press into which they are ultimately discharged by means of the bale conveyor of the instant invention.

A final object of this invention to be specifically enumerated herein is to provide a bale conveyor in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the bale conveyor of the instant invention shown with portions thereof being broken away and with the discharge end of the bale conveyor positioned adjacent the inlet of the bale opening press;

FIGURE 2 is a side elevational view of the discharge end portion of the conveyor of the instant invention;

FIGURE 3 is a side elevational view of the embodiment illustrated in FIGURE 1 and as seen from the right side of FIGURE 1;

FIGURE 9 is a diagrammatical view of the control circuit of the bale conveyor.

Figure 4:
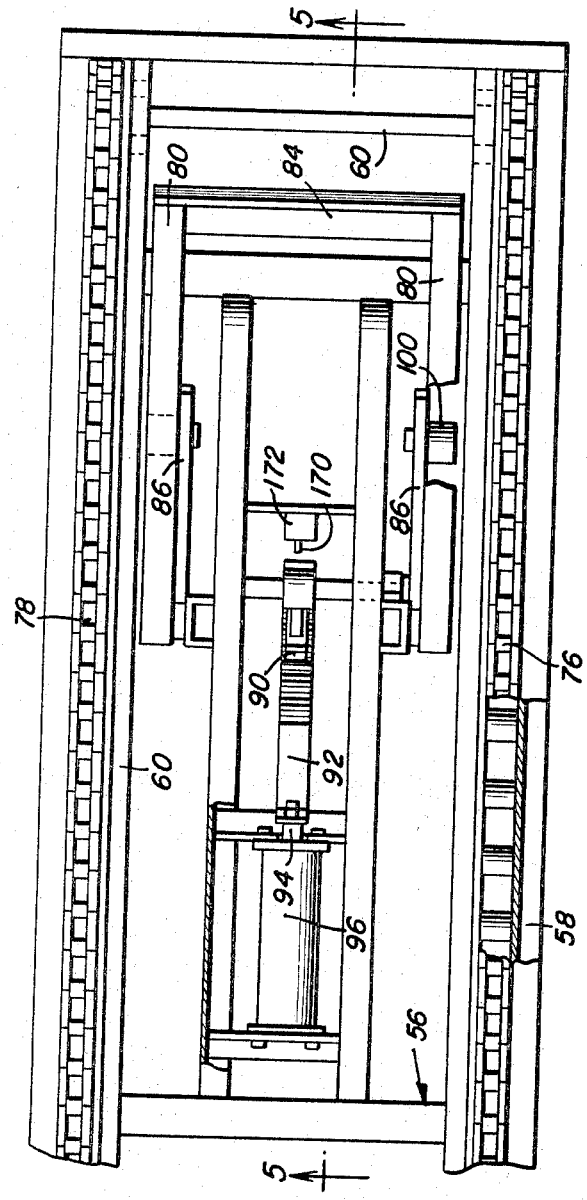
FIGURE 4 is an enlarged fragmentary top plan view of the bale flipping end portion of the discharge portion of the bale conveyor of the instant invention.

Referring now more specifically to the drawings the numeral 10 generally designates the bale conveyor of the instant invention which includes an inlet section generally referred to by the reference numeral 12 and an outlet section generally referred to by the reference numeral 14. The inlet section 12 includes a main frame generally referred to by the reference numeral 16 and including vertically adjustable depending supporting legs 18, 20 and 22.

The main frame 16 further includes a pair of opposite side members 24 and 26 suitably braced relative to each other and including downwardly directed outlet end portions 28 and 30.

A plurality of rollers 32 are journaled between the end portions 28 and 30 and a pair of shafts 34 and 36 are journaled between corresponding opposite end portions of the opposite side members 24 and 26 and include opposite end sprocket wheels 38 and 40, respectively. A pair of endless chains 42 and 44 are entrained about corresponding pairs of sprocket wheels 38 and 40 and the shaft 34 includes a driven sprocket 46 aligned with a driving sprocket 48 mounted on the output shaft of an electric motor 50. The sprocket 48 is drivingly connected to the sprocket 46 by means of an endless chain 52.

A transversely extending abutment plate 54 is secured between the downwardly inclined end portions 28 and 30 and is disposed adjacent the inlet end of the outlet section 14 of the bale conveyor 10. The outlet section or discharge section 14 of the conveyor 10 also includes a main frame which is generally referred to by the reference numeral 56 and which also includes opposite side members 58 and 60 between which a pair of shafts 60 and 62 are journaled, which shafts include opposite end sprocket wheels 64 and 66, respectively. The shaft 62 includes driven shaft 68 and an electric motor 70 is supported from the frame 56 and includes an output shaft having a drive sprocket 72 mounted thereon aligned with the driven sprocket 78 and drivingly connected to the latter by means of an endless flexible chain 74. A pair of endless chains 76 and 78 are entrained about corresponding pairs of sprocket wheels 64 and 66 and it will be noted that the upper reaches of the chains 76 and 78 as well as the upper reaches of the chains 42 and 44 ride along the upper surfaces of the opposite side members of the corresponding sections 14 and 12 of the bale conveyor 10.

The inlet end portion of the discharge section 14 has a pair of lift arms 80 pivotally secured thereto as at 82 at one pair of corresponding ends and the other pair of corresponding ends of the lift arms 80 are interconnected by means of a transverse brace 84. A pair of force arms 86 have corresponding end portions mounted fixedly on a transverse shaft 88 journaled from the frame 56. The shaft 88 further has secured thereto a sector gear 90 and the sector gear 90 is meshed with a rack gear 92 secured to the extendable piston portion 94 of an air cylinder 96 also supported from the frame 56, the rack gear 92 being guided by a transverse bearing plate 98 comprising a part of the frame 56.

Figure 5:
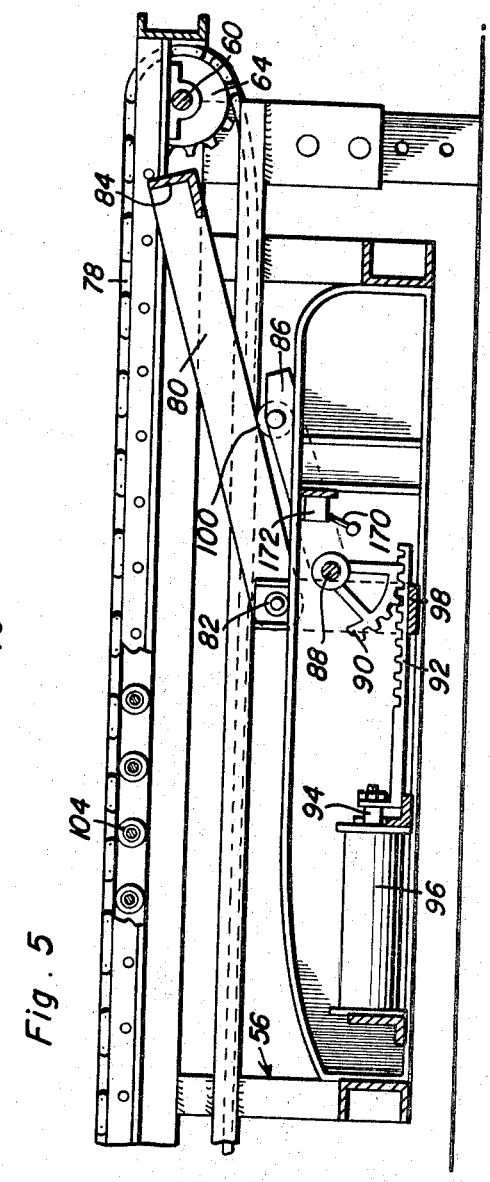
FIGURE 5 is a fragmentary vertical sectional view taken substantially upon the plane indicated by the section line 5—5 of FIGURE 4.
Figure 6:
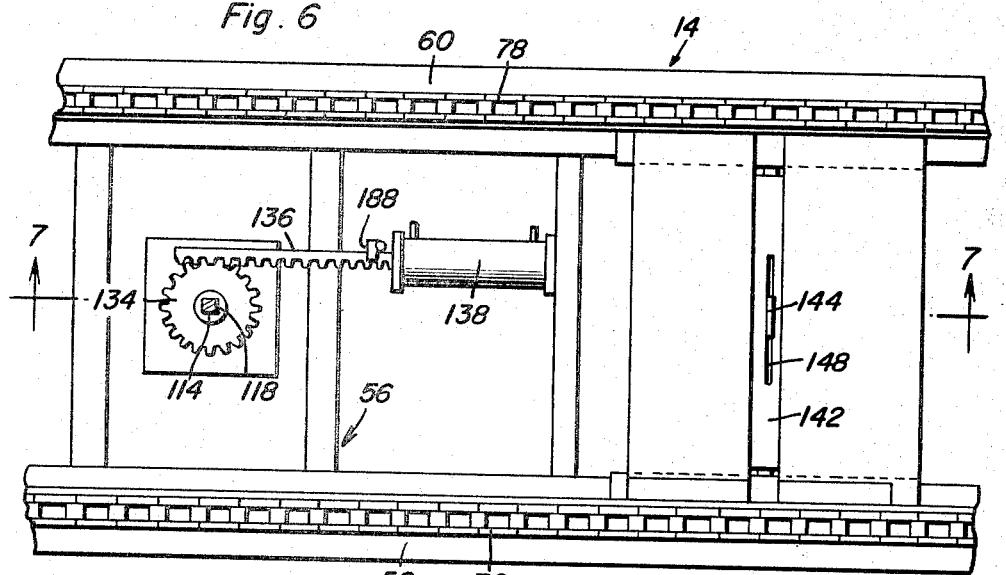
FIGURE 6 is an enlarged fragmentary top plan view of the bale rotating portion of the discharge end portion of the conveyor with portions thereof broken away and shown in horizontal section.

The free ends of the force arms 86 have rollers 100 journaled thereon and disposed in rolling contacting engagement with the undersurfaces of the corresponding lift arms 80. Thus, upon extension of the piston rod portion 94 of the cylinder 96 the rack gear 92 will be extended toward the right as viewed in FIGURE 5 of the drawings thereby effecting counterclockwise swinging movement of the sector gear 90 and causing the free ends of the force arms 86 to swing upwardly and therefore the free ends of the lift arms 80 also swing upwardly.

It will be noted that the lift arms 80 are swingable between the endless chains 76 and 78 and that the chains 76 and 78 have their upper reaches rollingly supported by means of rollers 104 journaled from the opposite side members 58 and 60, it being understood that similar rollers are journaled from the opposite side members 24 and 26 along which the upper reaches of the chains 42 and 44 are rollingly supported.

The discharge end portion of the outlet or discharge section 14 of the bale conveyor 10 includes a turntable lift assembly generally referred to by the reference numeral 110 and including an upstanding tubular shaft 112 journaled from the frame 56 by means of suitable journal blocks 114 and 115 supported from the frame 56. The tubular shaft 112 includes an internal cross-sectional shape which is constant and non-circular as at 114 and a solid turntable support rod 118 having a cross-sectional shape complementary to the internal cross-sectional shape of the tubular shaft 112 is slidably disposed in the latter for vertical reciprocation and has a lift and turning table 120 supported from its upper end. The lower end of the tubular shaft 112 has a downwardly opening semispherical socket 122 formed therein and a generally spherical upper terminal end portion 124 of a piston rod portion 126 is seatingly received within the socket 122. The piston rod portion 126 comprises a part of an air cylinder 132 supported from the frame 56 beneath the lift and turntable 120 and the tubular shaft 112 has a gear wheel 134 mounted thereon meshed with a rack gear 136 comprising a part of the piston rod portion of an air cylinder 138 also supported from the frame 56.

A bale sensing switch actuating mechanism generally referred to by the reference numeral 140 is mounted between the opposite side members 58 and 60 of the discharge section 14 of the conveyor 10 between the lift and turntable 120 and the lift arms 80. The actuating mechanism 140 includes a tubular pivot shaft 142 journaled between the opposite side members 58 and 60 and from which a bale sensing arm 144 is pivotally supported by means of a pivot fastener 146. The tubular pivot shaft 142 is diametrically slotted as at 148 to receive therethrough the bale sensing arm 144 and the lower end of the latter is weighted as at 150.

Figure 7:
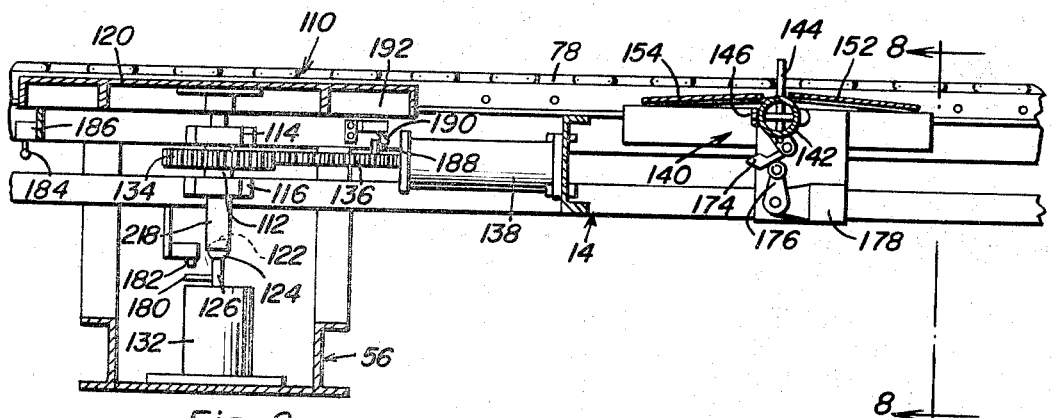
FIGURE 7 is a fragmentary longitudinal vertical sectional view taken substantially upon the plan indicated by the section line 7—7 of FIGURE 6.
Figure 8:
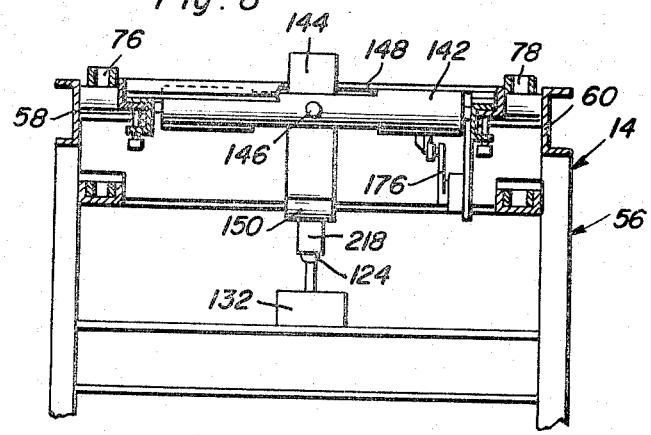
FIGURE 8 is a fragmentary transverse vertical sectional view taken substantially upon the plane indicated by the section line 8—8 of FIGURE 7.

From FIGURES 7 and 8 of the drawings it may be seen that the lowermost position of the lift and turntable 120 positions the upper surface thereof slightly below the upper surfaces of the chains 76 and 78 and that the upper end of the bale sensing arm 144 is normally disposed slightly above the upper surfaces of the chains 76 and 78. Further, the bale sensing switch actuating mechanism 140 includes approach and departure ramps 152 and 154 which are engageable by the bale sensing arm 144 to limit oscillation of the tubular pivot shaft 142 and which serve to prevent any portions of the bales moving along the discharge section 14 from catching on any portions of the tubular pivot shaft 142.

The frame 56 also includes vertically adjustable depending support legs 156, 158 and 160 and it may be seen that the inlet end portion of the discharge section 14 extends across and is disposed immediately adjacent the downwardly inclined outlet end portion or discharge end portion of the inlet section 12 of the conveyor 10.

With attention now directed more specifically to FIGURES 1 and 3 of the drawings it may be seen that a pair of bale contacting trip levers 162 are pivotally supported from opposite sides of the downwardly inclined end portions of the inlet section 12. The levers 162 are supported from the same pivotally supported cross shaft 164 in order that the levers 162 are mounted for simultaneous operation. The lever 162 adjacent the side member 124 includes a switch actuating arm 166 for operation of a limit switch 168 controlling the operation of the electric motor 50 in a manner to be hereinafter more fully set forth. In addition, the sector gear 98 is engageable with a limit switch arm 170 of a limit switch 172 for controlling operation of the air cylinder 96 in a manner which will also hereinafter be more fully set forth. Still further, the tubular pivot shaft 142 has an arm 174 operatively connected thereto for actuation of the switch actuating arm 176 of the limit and timer switch 178 controlling the operation of the electric motor 70.

Finally, the piston rod portion 126 of the cylinder 132 includes an arm 180 which is engageable with an actuating switch 192 controlling the operation of the air cylinder 138 and the free end of the rack gear 136 is engageable with a switch actuator 184 of an actuating switch 186 and an abutment 188 carried by the rack gear 136 is engageable with an actuator 190 of a control switch 192. The switches 186 and 192 control the operation of the air cylinder 132.

With attention now invited more specifically to FIGURE 9, it may be seen that there is provided a wiring circuit generally referred to by the reference numeral 200 which includes a solenoid actuated pushbutton switch 200 for actuating the motor 50 and a solenoid actuated pushbutton switch 202 for actuating the air cylinder 96 operatively connected to the lift arms 80 for flipping a bale of cotton. Further, a first pushbutton switch 204 is provided for controlling the operation of the motor 70 in conjunction with the limit and timer switch 178 and a second pushbutton switch 206 is also provided for controlling the operation of the motor 70 independently of the limit and timer switch 178. Further, a third pushbutton switch 208 is also provided for controlling the operation of the air cylinder 132 in conjunction with the switches 186 and 192.

The air cylinders 138 and 132 are connected to a suitable source 210 of compressed air and a solenoid actuated normally closed valve 212 is disposed upstream of the cylinder 132 for selectively communicating the latter with the source 210. In addition, inasmuch as the cylinder 138 of the double acting type, valves 214 and 216 are disposed in the conduits 218 and 220 communicating the opposite ends of the cylinder 138 with the source 210, the valves 214 being of the type of sequentially simultaneously communicate corresponding end portions of the air cylinder 138 with the source 210 and vent the opposite end portions of the air cylinder 138 through the conduits 222 and 224 to the ambient atmosphere.

The switches 186 and 192 may be of the time delay type so that when closed by the rack gear 136 they will remain closed for a short period of time but then automatically move to the open positions independently of the positions of their respective actuators after a short interval. The time delay switches 186 and 192 are operatively connected to the vent valve 226 on the air cylinder 132 and are operative to vent the cylinder 132 in a manner to be hereinafter more fully set forth. The switch 182 is operatively connected to the valves 214 and 216 and is operative to sequentially actuate the valves 214 and 216 on successive actuations thereof caused by upward movement of the piston rod portion 126 of the cylinder 132.

In operation, a fork lift operator may position two or three cotton bales 230 on the inlet section 12 of the conveyor 10. The operator of the conveyor then presses the solenoid actuated pushbutton switch 200 which actuates the motor 50 and thereby causes the bales 230 to be moved toward the discharge end portion of the inlet section 12. The solenoid actuated pushbutton switch 200, by means of the solenoid 200' thereof, maintains the motor 58 operating until such time as a bale rolls down the downwardly inclined discharge end portion of the inlet section 12 and strikes one or both of the levers 162 causing the switch 169 to momentarily open the circuit to the motor 50 thereby ceasing operation of the solenoid 200' and thereby maintaining the motor 50 inactive until such time as the pushbutton switch 200 is again depressed.

As the bale 230 rolls down the rollers 32 and strikes the adjacent end of the discharge section 14 of the conveyor 10 the momentum of the bale causes the latter to fall over on its side upon the discharge section 14 and in position over the lift arm 80. Then, if the buckles 232 of the straps 234 extending about the bale 230 positioned above the lift arm 80 are not disposed on the upper side of the bale 230, the operator of the conveyor then presses the solenoid actuated pushbutton switch 202 which causes the valve 236 to communicate the cylinder 96 with the source 210 and the piston rod 94 to be extended. This, of course, will cause force arms 86 to swing in a counterclockwise direction thereby raising the lift arms 80 and flipping the bale 230 180 degrees about a horizontal axis extending transversely of the discharge section 14. As the force arms 86 reach their uppermost limit of travel, the sector gear 90 engages the actuator 170 of the switch 172 which causes the circuit to the valve 236 to be opened thereby enabling the normally closed valve 236 to close. In addition, a venting valve 238 is operatively connected to the cylinder 96 for venting the latter and is normally open. However, when actuated, the valve 238 closes to prevent the cylinder 96 from venting to the ambient atmosphere. Thus, as the sector gear 90 strikes the actuator 170, the normally closed valve 236 is again returned to the closed position and the normally open valve 238 is opened in order to vent the cylinder 96. Of course, each time the solenoid actuated pushbutton switch 202 is actuated, the valve 236 opens and the valve 238 closes until such time as the sector gear 90 strikes the actuator 170 of the switch 172 to close the valve 236 and open the valve 238.

After the operator of the conveyor 10 has flipped the bale 230, he presses the switch 204 which momentarily closes the circuit to the motor 70 thus effecting operation of the motor 70 and causing the bale 230 to move toward the bale sensing switch actuating mechanism 140. However, closing the switch 204 also actuates the timer 178 which will cause the motor 70 to operate until such time as the bale sensing arm 144 is contacted by the bale 230 thus causing the actuating arm 176 to place the timer 178 on timed operation, which timed operation will terminate the operation of the motor 70 as the bale 230 is positioned over the lift and turntable 120.

As soon as the bale 230 is positioned over the lift and turntable 120 and the operation of the motor 70 has been terminated, the operator then notes the position of the buckles 232. If the latter are disposed toward the rear of the bale 230, the operator will then push the pushbutton 206 and maintain the latter depressed until such time as the resultant actuation of the motor 70 moves the bale 230 off the discharge end portion of the discharge section 14 and into the bale press 240 whereupon the bale 230 will drop downward into the press 240 while rotating 90 degrees in a clockwise direction as viewed in FIGURE 2 of the drawings into a position within the press 240 with the buckles 232 facing outwardly away from the conveyor 10 and disposed uppermost on the bale 230. However, should the buckles 232 be disposed adjacent the forwardmost end of the bale 230 positioned above the lift and turntable 120, the operator of the conveyor 10 will depress the pushbutton 208 opening the valve 212 and causing the cylinder 232 to extend the piston rod portion 226 thereof upwardly. This initial action will cause the lift and turntable 120 to be raised above the chains 76 and 78 thereby elevating the bale 230 supported from the table 120 above the chains 76 and 78. As the rod 218 reaches its uppermost point of travel the arm or actuator 180 on the piston rod portion 126 of the cylinder 132 will engage the switch 132 and cause the valve 214 to open communicating the adjacent end of the cylinder 138 with the source 210 and venting the remote end of the cylinder 138 with the ambient atmosphere. The switch 182 is of the flip type whereby successive actuations thereof will alternately effect actuation of the valves 214 and 216 thereby enabling the rack gear 136 to be extended the first time the switch 182 is actuated and the rack gear 136 to be retracted the next time the switch 182 is actuated.

Extension of the rack gear 136 will cause the gear 134 to rotate 180 degrees thereby rotating the bale 230 supported from the table 120 180 degrees in order to position the buckles 232 adjacent the rear of the bale 230 as illustrated in FIGURE 1. In addition, as soon as the free end of the rack 136 engages the actuator 184 of the switch 186, the switch 186 causes actuation of the vent valve 226 and thereby vents the cylinder 132 to the ambient atmosphere allowing the piston rod portion 126 and the table 120 to again be lowered. As previously set forth the switches 186 and 192 are of the time delay type and therefore when the switches are actuated they will initially open the valve 226 for a short period of time, which time is sufficient for the table 120 to be lowered, and then they will automatically render themselves inoperable to maintain the vent valve 226 open until they are again actuated by the rack gear.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cotton bale conveyor comprising a first elongated section including inlet and outlet ends and means operative to support and move a bale positioned thereon from the inlet end to the outlet end thereof, said first section including means operative to selectively rotate a bale positioned thereon 180 degrees about a horizontal axis extending transversely of said first section and also means operative to selectively rotate a bale positioned thereon 180 degrees about a vertical axis, said means being spaced longitudinally of said elongated section.

2. The combination of claim 1 wherein said means operative to rotate said bale about a horizontal axis includes means operative to cause roll, said bale to roll continuously one-half revolution about said horizontal axis toward said other end portion of said first section.

3. The combination of claim 1 wherein said means operative to rotate said bale about a vertical axis includes means operative to sequentially lift said bale for engagement with said means operative to support and move said bale toward said outlet end, rotate said bale 180 degrees about a vertical axis, and then lower the lifted and rotated bale down into supporting engagement with said means operative to support and move said bale.

4. The combination of claim 1 wherein said means operative to rotate said bale about a vertical axis includes means operative to sequentially lift said bale for engagement with said means operative to support and move said bale toward said outlet end, rotate said bale 180 degrees about a vertical axis, and then lower the lifted and rotated bale down into supporting engagement with said means operative to support and move said bale, said means operative to rotate said bale about a horizontal axis including means operative to roll said bale one-half revolution about said horizontal axis toward said other end portion of said first section.

5. The combination of claim 4 including a second elongated conveyor section including receiving and discharge ends, said second conveyor section being disposed at substantially right angles relative to said first section and with its discharge end disposed adjacent and opposing one side of the inlet end of said first section, said second section also including means operative to support and move an upstanding bale positioned thereon along said second section toward the discharge end thereof, said discharge end of said second section including means operative to discharge said bale therefrom in a manner tilting the upper end of said bale over the inlet end of said first section while preventing the lower end of said bale from moving off said discharge end thereof causing said bale to "flop" on one of its sides on the inlet end of said first section.

6. The combination of claim 1 including a second elongated conveyor section including receiving and discharge ends, said second conveyor section being disposed at substantially right angles relative to said first section and with its discharge end disposed adjacent and opposing one side of the inlet end of said first section, said second section also including means operative to support and move an upstanding bale positioned thereon along said second section toward the discharge end thereof, said discharge end of said second section including means operative to discharge said bale therefrom in a manner tilting the upper end of said bale over the inlet end of said first section while preventing the lower end of said bale from moving off said discharge end thereby causing said bale to "flop" on one of its sides on the inlet end of said first section.

7. The combination of claim 1 wherein said means operative to support and move said bale includes a pair of elongated generally parallel opposite side members movable along said first section, said means operative to rotate said bale about a vertical axis including a lift and turntable disposed between said support members, vertically oscillatable between first and second positions disposed below and above the upper surfaces of said support members, and intermittently rotatable about a vertical axis 180 degrees in response to its movement from said first position to said second position.

8. A cotton bale conveyor with bale orientating means, said conveyor comprising a first elongated section including inlet and outlet ends and means operative to support and move a bale positioned thereon from the inlet end to the outlet end thereof, said first section including means operative to selectively rotate said bale 180 degrees about a horizontal axis extending transversely of said first section and means operative to selectively rotate said bale 180 degrees about a vertical axis, said means operative to support and move said bale including a pair of elongated generally parallel opposite side support members movable along said first section, said means operative to rotate said bale about a horizontal axis including elongated lift arm means pivotally supported at one end for oscillatory swinging movement of the other end thereof about an axis extending transversely of said first end and said first section and between a first position with said arm means generally horizontally disposed and disposed beneath a plane containing the upper surfaces of said elongated support members and a second position with the free end of said arm means inclined upwardly and swung toward said outlet end of said first section.

9. A cotton bale conveyor with bale orientating means, said conveyor comprising a first elongated section including inlet and outlet ends and means operative to support and move a bale positioned thereon from the inlet end to the outlet end thereof, said first section including means operative to selectively rotate said bale 180 degrees about a horizontal axis extending transversely of said first section and means operative to selectively rotate said bale 180 degrees about a vertical axis, said means operative to support and move said bale including a pair of elongated generally parallel opposite side members movable along said first section, said means operative to rotate said bale about a vertical axis including a lift and turntable disposed between said support members, vertically oscillatable between first and second positions disposed below and above the upper surfaces of said support members, and intermittently rotatable about a vertical axis 180 degrees in response to its movement from said first position to said second position, said means operative to rotate said bale about a horizontal axis including elongated lift arm means pivotally supported at one end for oscillatory swinging movement of the other end thereof about an axis extending transversely of said first end and said first section and between a first position with said arm means generally horizontally disposed and disposed beneath a plane containing the upper surfaces of said elongated support member and a second position with the free end of said arm means inclined upwardly and swung toward said outlet end of said first section.

10. A cotton bale conveyor comprising a first elongated section including inlet and outlet ends, an elongated cotton bale comprising an elongated body generally rectangular in cross-sectional shape and including first and second pairs of opposite wide and narrow generally parallel longitudinal sides, the sides of each pair of sides being generally right angularly disposed relative to the other pair of sides, said bale including somewhat rounded corners joining said adjacent sides of pairs of sides, said conveyor including support means upon which said bale rests with one of said wide sides disposed lowermost and said bale extending transversely of said second, said support means being operative to support and move said bale from said inlet end to said outlet end, said first section including means operative to selectively rotate said bale 180 degrees about its longitudinal axis in a continuous rotating motion, said means operative to rotate said bale about a horizontal axis including elongated lift arm means pivotally supported at one end for oscillatory swinging movement of the other end thereof about an axis extending transversely of said first end and said first section and between a first position with said arm means generally horizontally disposed and disposed beneath a plane containing the upper surfaces of said elongated support member and a second position with the free end of said arm means inclined upwardly and swung toward said outlet end of said first section.

References Cited

UNITED STATES PATENTS

| | | | |
|---|---|---|---|
| 495,683 | 4/1893 | Rigby | 198—33 |
| 1,352,329 | 9/1920 | Tschache | 198—33 |
| 2,677,452 | 5/1954 | Mallow | 198—33 |
| 2,997,187 | 8/1961 | Burt | 214—6 |
| 3,080,041 | 3/1963 | Luce | 198—33 |

EVON C. BLUNK, *Primary Examiner.*

EDWARD A. SROKA, *Examiner.*